Figure 1:
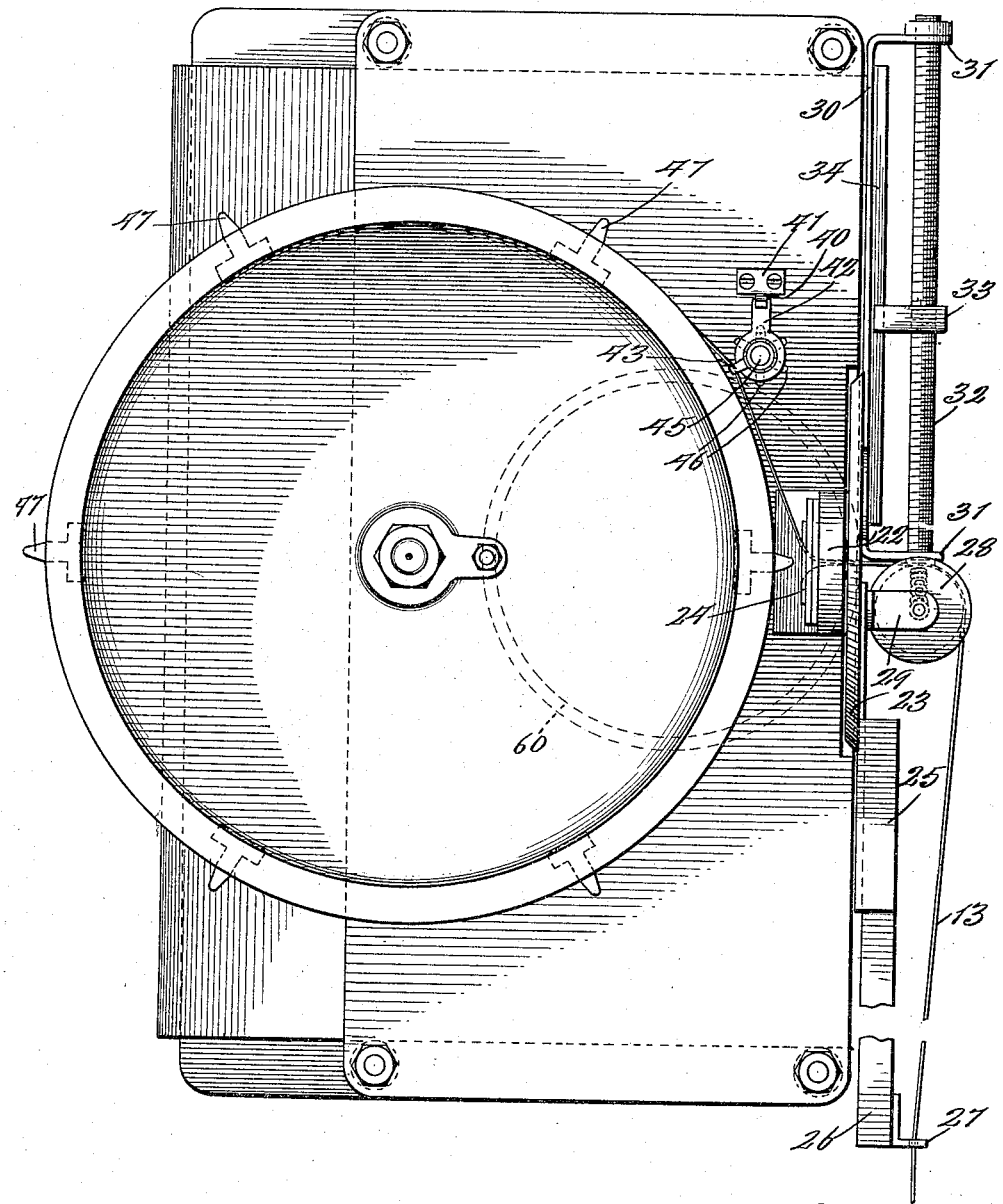

J. AIREY & K. F. KEELER.
AREA METER.
APPLICATION FILED AUG. 12, 1915.

1,174,649.

Patented Mar. 7, 1916.
5 SHEETS—SHEET 1.

Inventors:
John Airey
Karl F. Keeler
By Cheever & Cox
Attys.

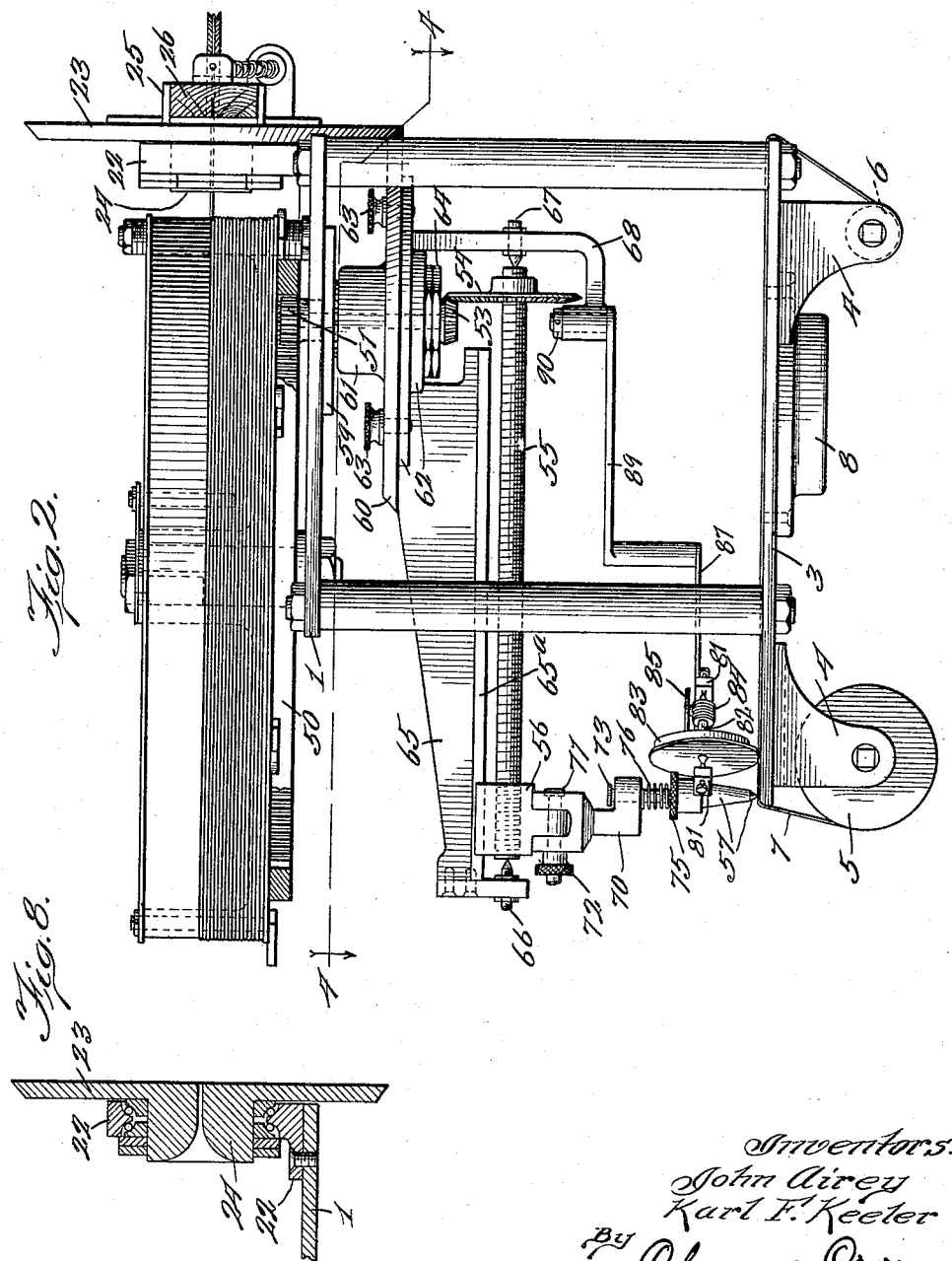

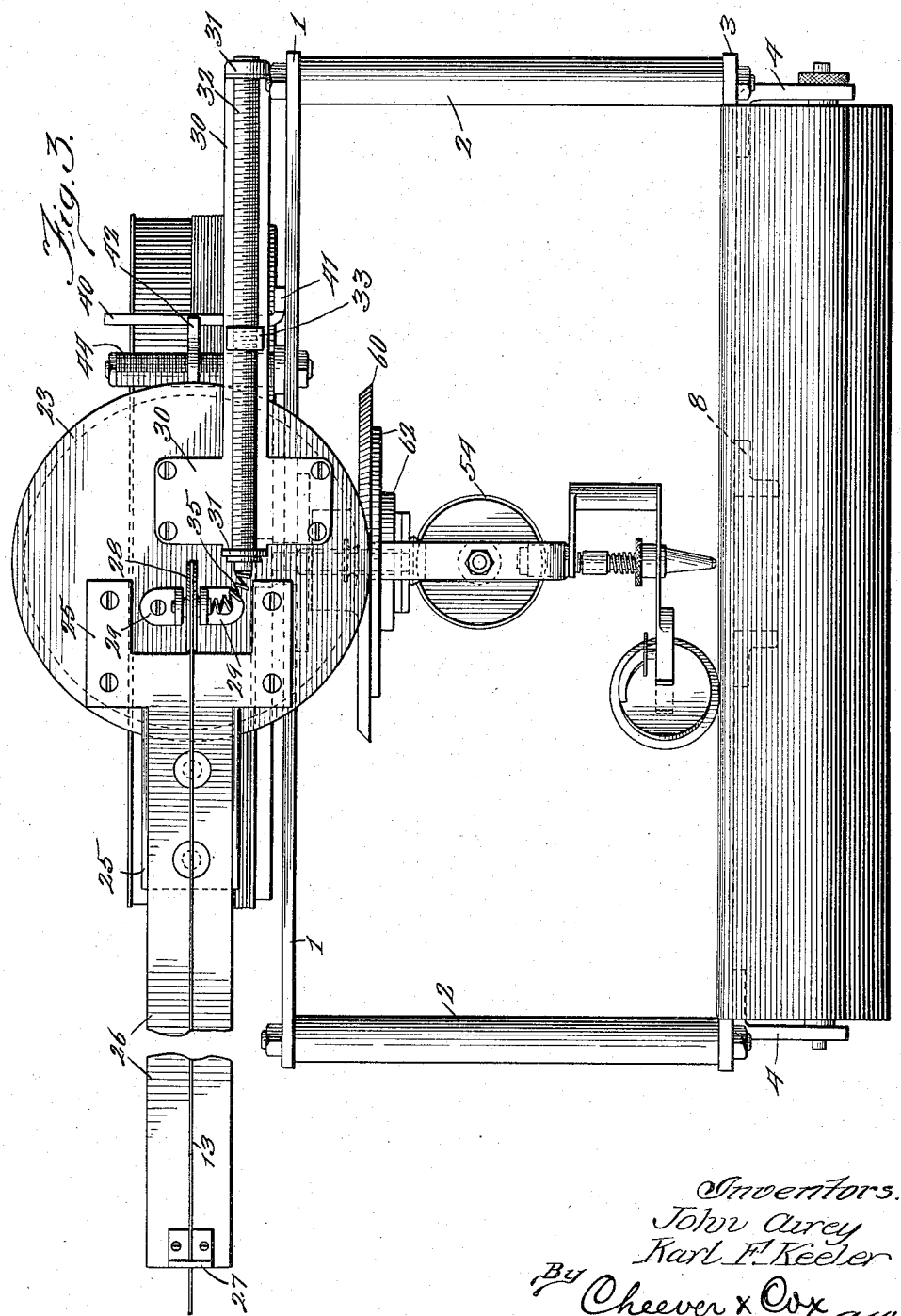

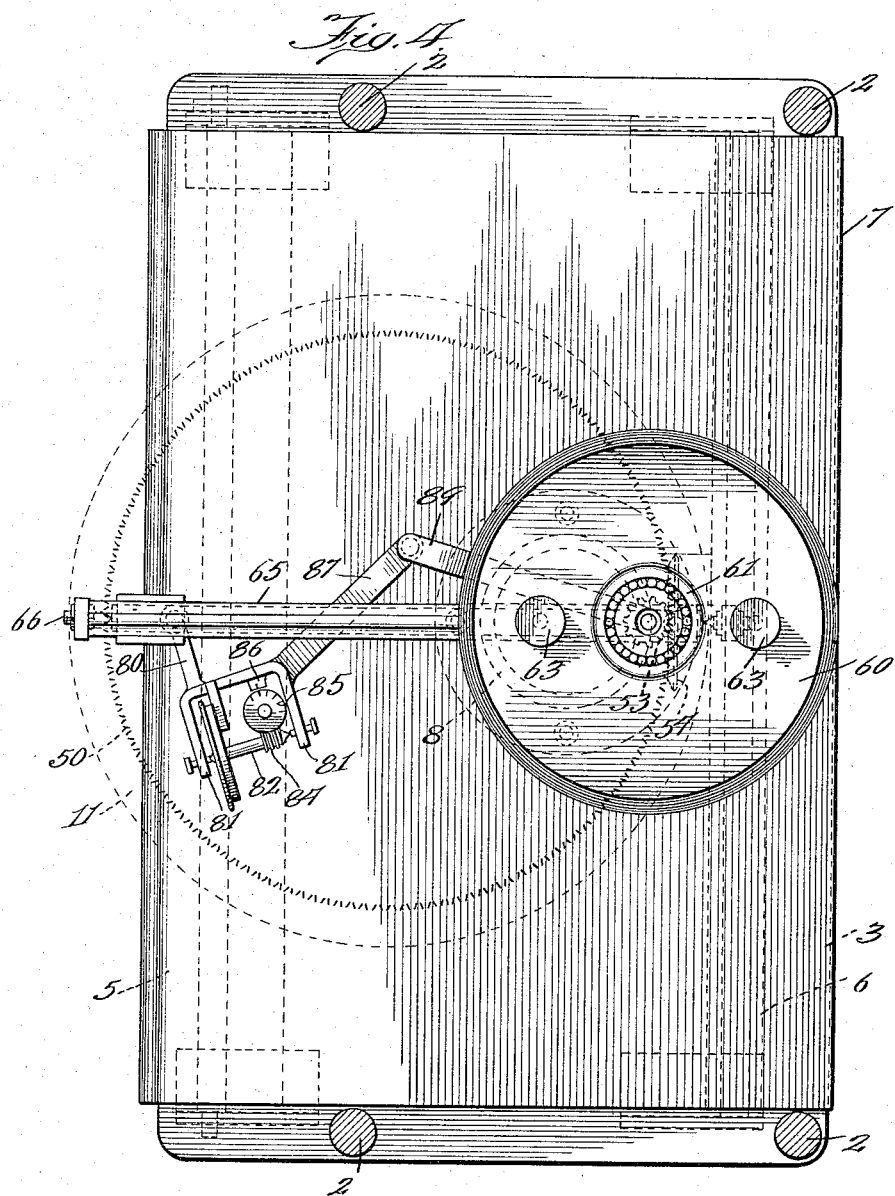

J. AIREY & K. F. KEELER.
AREA METER.
APPLICATION FILED AUG. 12, 1915.
1,174,649.
Patented Mar. 7, 1916.
5 SHEETS—SHEET 5.
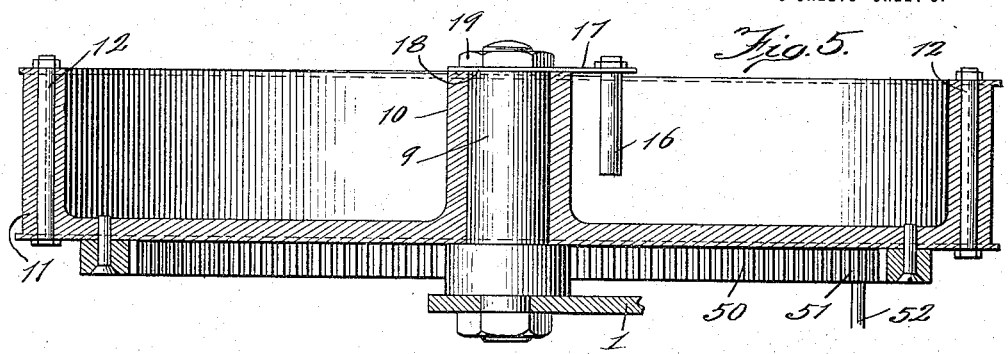
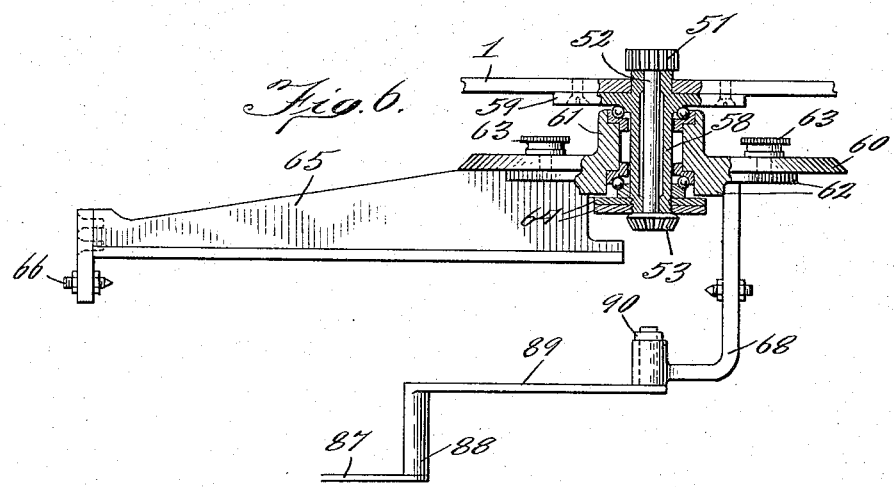
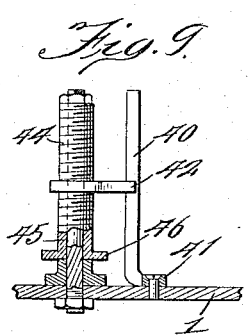
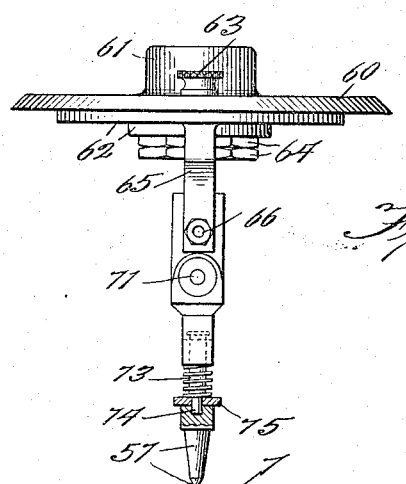
Inventors
John Airey
Karl F. Keeler
By Cheever & Cox
Att'ys

UNITED STATES PATENT OFFICE.

JOHN AIREY AND KARL F. KEELER, OF ANN ARBOR, MICHIGAN.

AREA-METER.

1,174,649.

Specification of Letters Patent.

Patented Mar. 7, 1916.

Application filed August 12, 1915. Serial No. 45,237.

*To all whom it may concern:*

Be it known that we, JOHN AIREY, a subject of the King of Great Britain, residing at Ann Arbor, in the county of Washtenaw and State of Michigan, and KARL F. KEELER, a citizen of the United States, residing at Ann Arbor, in the same county and State, have invented a certain new and useful Improvement in Area-Meters, of which the following is a specification.

Our invention relates to area meters and is especially adapted to be used by surveyors in the field to make a miniature record or graph of the contour of the area to be measured, surveyed or computed, and to give one or more readings by which the user can either read directly or readily calculate the area in square feet, square yards or square meters or whatever unit has been arranged for in the apparatus. The graph and the readings may be obtained by simply causing the free end of the tape or wire to trace the outline or contour (or a part of such outline or contour) of the area, and noting one or a few of the readings exhibited upon the proper indicating devices.

The present apparatus is in some respects analogous to the one shown in Patent, Number 1,129,872, issued March 2, 1915 to Karl Keeler, one of the joint inventors of the present invention, and to the one shown in application, Serial Number 10,685 filed February 26, 1915, by John Airey the other of the joint inventors of the present invention.

The object of this invention in its general aspects is to provide an instrument capable of accurately performing the functions above outlined, and performing them in such manner as to require comparatively little skill or expert knowledge on the part of the user. This general object is attained by constructing and correlating various elements and groups of elements in the manner hereinafter described.

We accomplish our objects by the mechanism illustrated in the accompanying drawings, in which—

Figure 1 is a plan assembly view. Fig. 2 is an elevation from one side, and Fig. 3 an elevation from another side of the instrument. Fig. 4 is a plan-section on the line 4—4 Fig. 2. Fig. 5 is an axial section of the reel and associated parts. Fig. 6 is a side elevation of a certain group of elements, most of which rotate in unison in correspondence to the angular movements of the wire in tracing the contour. Fig. 7 is a view looking from the left end of Fig. 6, and showing also the pencil and its mountings. Fig. 8 is a vertical sectional view of the wire guide or eyelet and parts associated therewith. Fig. 9 is a detail elevation partly in section of the wire distributing means.

Similar numerals refer to similar parts throughout the several views.

Now describing the particular design selected to illustrate the principles of the invention, the main supporting frame work consists chiefly of a plate 1 supported upon four posts 2, rising from the lower plate or table 3. To the under side of plate 3 are fastened four brackets 4, carrying rolls 5 and 6. The paper 7 passes from the supply roll 5 over the table 3 to the receiving roll 6 as best shown in Fig. 2. A socket 8 is fastened to the under side of plate 3 for attachment to a tripod (not shown). It is evident that the parts 1, 2, 3, 4 and 8 may be regarded as a stationary frame for supporting the paper and operating parts of the instrument.

A stud 9 is bolted to the upper plate 1 as shown in detail in Fig. 5. This stud is stationary and serves as an axle for the wire reel 10 which in the preferred design, is encircled by a removable shell 11 held in place by bolts 12. Said reel supports the wire 13, the turns thereof lying side by side. By arranging the turns of the wire side by side in direct contact with the surface of the shell of the reel, the amount of rotation of the reel always bears the same proportion to length of wire unwound. The advantage in making the shell removable is that it facilitates placing and replacing the wire during the course of manufacture or in case, from breakage or otherwise, it becomes necessary to renew the wire. It will be understood that while, for convenience, we employ the term "wire" any flexible non-stretchable element is indicated. Within the reel a coiled spring (not shown) is provided for keeping the wire taut when drawn out and for winding up the wire. Said spring is fastened at one end to the inside of the reel and at the other end to a stationary pin 16 supported from an arm 17 resting upon a shoulder 18 at the upper end of stud 9. The said arm is held in position by a nut 19 and serves also to hold the reel in position upon the stud.

Rigidly attached to plate 1 is a standing bracket 22 in which is journaled a bevel wheel 23 as indicated in detail in Fig. 8. Said wheel has an eyelet 24 formed concentrically therein for guiding the wire as it passes off of the reel. Rigidly attached to wheel 23 is an arm 25 which supports an extension 26, the extension being preferably of wood. At the end of said arm 25, 26, is another eyelet 27 through which the wire passes. Between the eyelet 24 and the eyelet 27 the wire passes over a guide sheave 28 mounted on the brackets 29 secured to the wheel 23 as best indicated in Figs. 1 and 3. Thus it is evident that so long as the wire is held taut, an angular motion of the wire—that is, a sweep in a vertical plane—will cause the bevel wheel 23 to rotate about its axis. It is also evident that the sag of the wire will depress the end of the arm slightly beyond the position it would otherwise assume.

Rigidly attached to said bevel wheel 23 is a bracket 30 located in line with the arm 26 but extending in the opposite direction therefrom. Said bracket has two arms 31, in which is journaled a screw 32 provided with a traveling counterbalance nut 33, which is guided by a bar 34. Said screw is connected by a flexible shaft 35 to the sheave 28 and the construction and arrangement are such that when the wire is drawn outward and rotates the sheave 28, said flexible shaft 35 will rotate the screw 32 in a direction to cause the traveling counterbalance nut to move outward away from the center of the bevel wheel 23. It will thus be manifest that the greater the length of wire which is out, the greater will be the distance of the counterbalance nut from the center of the bevel wheel, with the result that said counterbalance tends to correct the position of the bevel wheel and neutralize the effect which the sag of the wire would otherwise have upon said bevel wheel.

The wire is guided evenly upon the reel by a distributing device indicated in Figs. 1, 2 and 3, and shown in detail in Fig. 9. This consists chiefly of an upright guide 40, secured by a foot 41 to the top plate 1 and preventing the rotation of a traveling distributer 42, which has an eye 43 (see Fig. 1) through which the wire passes and by which it is guided onto the reel. Said distributer is internally threaded to receive the screw 44, which is rotatable upon the stud 45 rising from plate 1. A star wheel 46 is formed on screw 44 for rotating it, and said star wheel is actuated by teeth 47 projecting radially from the reel. As the reel rotates the teeth 47 rotate the star wheel thereby causing the rotation of screw 44 which in turn causes the distributer 42 to travel vertically, that is, in a direction parallel to the axis of the reel.

Referring now to the parts more closely associated with the pencil by which the contour is graphically recorded, and later to the planimeter from which the area may be directly read or easily computed: Fastened to the bottom of the wire reel is an internal gear 50, which drives a pinion 51 rigidly secured to a shaft 52, having at its lower end a bevel pinion 53, meshing with a bevel gear 54, rigidly fastened to a screw 55 which operates a nut 56, which carries a pencil 57. These parts control the radial position of the pencil, that is, the distance of the pencil from the point on the graph corresponding to the position of the instrument as a whole relatively to the actual area which is being measured or computed. In other words, these parts move the pencil radially outward in proportion to the length of wire out. In the particular design shown, shaft 52 is journaled in the barrel 58 of a bracket 59 fastened to the under side of plate 1, as best shown in Figs. 2 and 6.

We use the term "pencil" generically, as including any of the well known forms of recorders such as a graphitic "lead," a stylus, stylographic pen or fountain pen.

Concentric with shaft 52 is a bevel wheel 60 which gears with bevel wheel 23. These wheels are of the same size and consequently always move to the same angular distance, and as the angular movement of the wheel 23 is always equal to the angular movement of the wire, it follows that the angular movement of the wheel 60 and parts fastened thereto, is always equal to the angular movement of the wire. In the particular construction illustrated, the bevel wheel 60 has a hollow cylindrical hub 61 formed thereon through which the parts 52 and 58 pass. Wheel 60 is supported upon a plate 62 to which it is fastened by knurled headed screws 63. The lower end of the barrel 59 is screw threaded and plate 62 is supported by nuts 64 screwing onto the lower end of said barrel. The screws 63 are located 180° apart, so that when desired, the plate 62 and the arm 65 (which extends radially therefrom and is preferably integral therewith) may be adjusted to either of two positions 180° apart. Arm 65 is provided with a center point 66 at its outer end for supporting the outer end of screw 55. The other end of said screw is supported upon a center point 67 carried by bracket 68 which depends from plate 62 and is preferably brazed thereto. Said arm is also furnished by a guide 65ᵃ by which the nut 56 is made to travel rectilinearly when screw 55 rotates.

Referring now to the illustrated form of the parts supporting the pencil (see especially Figs. 2, 3 and 7), a block 70 is fastened to nut 56 by a pin 71 provided with a knurled head nut 72. The construction is such that when said nut is tightened upon the hinge pin, said block will be rigidly fastened to nut 56. Block 70 forms a guide for a stem 73 which has an extension 74 of reduced diameter formed at its lower end, as shown in detail in Fig. 7, and knurled disk 75 is fastened by drive fit or otherwise at the upper end of extension 74 and said stem is normally pressed downward by a helical spring 76 interposed between disk 75 and the lower end of block 70. Extension 74 fits into a socket formed in the upper end of the pencil and when it is desired to ease off the pencil slightly, that is, to raise it vertically a slight distance for the introduction beneath it of a templet, it may be accomplished by simply grasping the disk 75 and pushing it upward. But if it is desired to swing the pencil out of the way for applying a ruler to the surface of the paper for drawing the closing line of a contour, or other purpose, the screws 63 may be removed, thus permitting the parts secured thereby to be temporarily removed.

Taking up next the planimeter, an arm 80, best shown in Fig. 4, extends horizontally from the pencil 57 and is preferably cast integral therewith. Integral with said arm is a yoke having two branches 81 which support the rotatable shaft 82 of the planimeter, said shaft has a planimeter wheel 83, fastened thereto, and a worm 84 which rotates a dial 85, said dial coöperates with a vernier 86 by means of which the dial may be read to square feet or fractions thereof, or to any other unit of area previously determined upon. Extending from the yoke 81 is an arm 87 which is articulately connected at the joint 88 to the arm 89, which in turn is articulately connected at the joint 90 to the end of the bracket 68. The axis of joint 90 is coincident with the axis of rotation of the arm 65, and hence is stationary relative to the table 3, upon which the record paper is carried.

Our planimeter has the advantage of reading correctly even when the pole is inside the area to be planimetered. With an ordinary planimeter a correction must be made under such circumstances. By the "pole" we mean the point where the axis of the joint 90 penetrates the plane of the record sheet. This novel characteristic is due to the fact that the axis or central longitudinal line of the pencil lies at the intersection of two planes arranged 90° apart. One of said planes being the plane of the rim of the wheel 83, and the other of these planes being the plane determined by the axis of the pencil and the axis of the intermediate joint, that is, the joint connecting the arms 87 and 89. The relation of these parts will be clearly understood by referring to Fig. 4. In the present construction also, the distance between the pencil axis and the axis of the intermediate joint is equal to the distance between the pole and the axis of the intermediate joint. As a result the planimeter commands all positions around the pole.

The general mechanical operation of the instrument will be apparent from the foregoing description. When it is desired to measure areas lying in a vertical plane, as in the case of cuts and fills, the instrument will be set up so that the arm 26 will swing in a vertical plane. The parts will then appear in elevation as shown in Figs. 2 and 3. When horizontal areas are to be measured, the instrument will be set up so that the arm 26 will swing horizontally. In either event, after the instrument is set up, the assistant takes the free end of the wire and traces the contour, or so much of it as can be traced. The coaction of the parts is such that the greater the amount of wire out, the greater will be the distance of the pencil and planimeter wheel from the point on the paper pierced by the axis of the shaft 52 and joint 90. This axial point represents, on the paper, the point occupied by the instrument with reference to the area to be measured. The parts are so proportioned that the movement will conform exactly to a known scale. Any angular movement of the wire will produce a like angular or rotary movement of the arm 26, which will be transmitted in equal amount to the pencil and planimeter. The spring 15 in the reel is heavy and thus tends to keep the wire taut and when measuring vertical areas the sag of the wire is compensated for by the automatically operating counter-balance 33 as described.

Various practical applications may be made of our instrument to surveying problems but it will be sufficient for the present purpose to describe but a single simple case, to wit; where the contour can be completely transversed by the end of the wire; as for example in measuring horizontal areas.

The instrument is mounted on the tripod, which may be placed at any point either within or without the area, but preferably, for convenience, at or near the center. The instrument will be so mounted that the arm 26 will swing in a horizontal plane. The observer stands at the instrument while his assistant takes the end of the wire to some point on the contour. The observer then takes and records the reading on the integrating mechanism (the dial 85, wheel 83 and vernier 86). The assistant now walks around the contour causing the end of the wire to trace the outline. When he has completed the circuit he halts and the observer takes another reading of the integrating mechanism. The difference between these two readings gives the area of the surface swept over by the wire in square feet or in whatever unit has been arranged for. During this process a scale drawing of the contour traced will have been produced upon the paper.

When it is desired to measure and graphically record the shape of areas lying in a vertical plane, as in the case of cuts and fills, the instrument will be so mounted that the arm 26 will swing in a vertical plane. The method in such case will be analogous to the one above described, except that the contour must be closed along an imaginary straight line, and steps taken accordingly. In producing the graphical record the straight line will be drawn on the paper by a ruler, and it is to accommodate the ruler or similar implements that the pencil is removable and adjustable in the manner already described in detail.

By the aid of our instrument some quite complicated problems may be solved very quickly and easily especially by employing suitable templets. Such templets may be advantageously made out of sheet celluloid and as the pencil of our instrument is vertically yieldable to a certain extent it will readily accommodate itself to templets laid upon the paper and will permit the pencil to travel along the surface of the templets and down again onto the paper to thereby accurately and automatically obtain the intersection points where the line drawn by the paper intersects the boundary lines of the templet.

It will be understood that while our instrument is capable of simultaneously producing both a graphical and a numerical record it is possible to remove either the pencil or the planimeter without impairing the value of the one which remains. It will also be understood that the "pencil" herein referred to may be of metal instead of graphite or similar substance, in which case the pencil would become a pointer for tracing a contour already recorded on the paper.

Having thus described our invention, what we claim as new and desire to secure by Letters Patent, is:

1. In a device of the class described, the combination of a rotatable arm, a pencil movable longitudinally of said arm, an extensible element, gearing connecting said extensible element to said pencil, whereby the longitudinal movement of said extensible element moves said pencil longitudinally of said arm, said extensible element being also angularly movable and means connecting said extensible element to said arm for rotating said arm when said extensible element is moved angularly.

2. In a device of the class described, the combination of a reel, a wire wound upon said reel, a rotatable arm, a pencil movable longitudinally of said arm, the free portion of said wire being angularly movable, means for connecting the free portion of the wire to said arm, whereby the angular movement of said wire produces a corresponding angular movement of said arm, and means operated by said reel for moving said pencil longitudinally of said arm.

3. In a device of the class described, the combination of a rotatable arm, a pencil movable longitudinally of said arm, a screw connected to said pencil for moving it longitudinally of said arm when said screw is rotated, a reel geared to said screw for rotating it when said reel is rotated, a wire wound upon said reel, a guide through which said wire passes in passing off of said reel, the portion of said wire beyond said guide being angularly movable, and means for connecting the portion of the wire beyond the guide to said arm for rotating it.

4. In a pantograph, a rotatable arm, a pencil movable longitudinally of said arm, en extensible element, reduction gearing connecting said extensible element to said pencil for moving said pencil lengthwise of said arm a distance less than the longitudinal movement of said extensible element, said extensible element being also angularly movable, and means for connecting said extensible element to said arm whereby the angular movement of said extensible element causes said arm to rotate.

5. In a device of the class described, the combination of a reel, a wire wound upon said reel, a rotatable arm, a pencil movable longitudinally of said arm, the free portion of said wire being angularly movable, means for connecting the free portion of said wire to said arm for rotating it, and a reduction gearing operated by said reel for moving said pencil longitudinally of said arm, the speed ratio of said gearing being such as to reduce the movement of the pencil compared to the peripheral movement of the reel.

6. In a pantograph, the combination of a reel, a wire wound upon said reel, a rotatable arm, a pencil movable longitudinally of said arm, the free portion of said wire being angularly movable, means for connecting the free portion of said wire to said arm for rotating it, a rotatable screw for moving said pencil lengthwise of said arm, and gear wheels connecting said reel to said screw for rotating it.

7. In a pantograph, the combination of a stationary support, a reel mounted upon said support, a wire wound upon said reel, a rotatable arm, a pencil movable longitudinally of said arm, gearing connected to said pencil and to said reel whereby the rotation of the reel moves the pencil lengthwise of said arm, the free portion of the wire being angularly movable, means for connecting the free portion of the wire to said arm for rotating it, and a spring connected at one end to said reel and at the other end to said support for winding up the wire.

8. A pantograph having a rotatable arm, a pencil movable lengthwise thereof, a reel, a wire wound upon said reel, and gearing connecting said reel and said pencil for moving the latter lengthwise of said arm, said gearing including a toothed ring fastened to said reel, and a pinion meshing with said ring and geared to said pencil; the free portion of said wire being angularly movable and means for connecting the free portion of the wire to said arm for rotating it.

9. A pantograph having a rotatable arm, a pencil movable lengthwise thereof, a reel, a wire wound upon said reel, a stationary eye through which said wire passes in leaving said reel, the free portion of said wire beyond said eye being angularly movable, means for connecting the free portion of the wire to said arm for rotating it, a screw arranged lengthwise of said arm for moving said pencil lengthwise of said arm when said screw is rotated, and gearing connecting said reel to said screw for rotating said screw when said reel is rotated.

10. In a device of the class described, the combination of a table, a rotary element rotatable in a plane parallel to said table, a recording device traveling upon said table and guided by said rotary element and movable radially toward and from the axis of rotation of said rotary element, an extensible element, gearing connecting said extensible element to said recording device for moving said recording device radially toward and from the axis of said rotary element, said extensible element being also angularly movable, and means for connecting the angularly movable extensible element to said rotary element for rotating it.

11. In a device of the class described, the combination of a table, a rotatable arm rotating in a plane parallel to said table, a recording device traveling upon said table and movable lengthwise of said arm, a reel geared to said recording element for moving it lengthwise of said arm when said reel is rotated, a wire wound upon said reel, a stationary guide through which said wire passes in leaving said reel, the portion of the wire beyond the guide being angularly movable, and means for connecting the portion of the wire beyond the guide to said arm for rotating it.

12. In a device of the class described, the combination of a table, a rotatable arm rotating in a plane parallel to said table, a recording device traveling upon said table and moving lengthwise of said arm, a screw engaging said recording device for moving it lengthwise of said arm when said screw is rotated, a reel geared to said screw for rotating it, a wire wound upon said reel, a stationary guide through which said wire passes in leaving said reel, and means for connecting the free portion of said wire to said arm for rotating it when the free portion of the wire swings angularly.

13. In a device of the class described, the combination of a stationary table, a recording device traveling upon said table, a rotary element rotating in a plane parallel to said table, a screw arranged parallel to the table and geared to said recording device for moving it radially toward and from the axis of said rotary element, a reel, a wire wound upon said reel and geared to said screw for rotating the screw when the reel is rotated, a stationary guide through which the wire passes in leaving the reel, a coiled spring one end of which is stationary and the other fastened to the reel for winding in the wire, the portion of said wire beyond said guide being angularly movable, and means for connecting the free portion of said wire to said rotary element for rotating it.

14. A pantograph having a stationary table, an arm rotating parallel to said table, a reel, a wire wound upon said reel, a stationary guide through which said wire passes in leaving said reel, means for connecting the free portion of said wire to said arm for rotating it, a traveling block movable lengthwise of said arm, said block being geared to said reel whereby the rotation of the reel causes the block to travel lengthwise of said arm, and a pencil traveling upon said table and hinged to said block whereby the pencil may be swung away from the table.

15. A pantograph having a stationary table, an arm rotating parallel to said table, a reel, a wire wound upon said reel, a stationary guide through which said wire passes in leaving said reel, means for connecting the free portion of said wire to said arm for rotating it, a traveling block movable lengthwise of said arm, said block being geared to said reel whereby the rotation of the reel causes the block to travel lengthwise of said arm, a pencil traveling upon said table and mounted upon said block, and a spring for yieldingly urging said pencil toward the table.

16. A pantograph having a stationary table, an arm rotating parallel to said table, a reel, a wire wound upon said reel, a stationary guide through which said wire passes in leaving said reel, means for connecting the free portion of said wire to said arm for rotating it, a traveling block movable lengthwise of said arm, said block being geared to said reel whereby the rotation of the reel causes the block to travel lengthwise of said arm, a pencil traveling upon said table and having a socket formed in its upper end, and a pin yieldingly mounted in said block and having its lower end fitting into said socket, for the purpose described.

17. In a device of the class described, the combination of a table, a rotary element rotatable in a plane parallel to said table, a recording device traveling upon said table and movable lengthwise of said arm, a reel, a wire wound upon said reel, a stationary guide through which said wire passes as it leaves the reel, the portion of the wire beyond the guide being angularly movable and connected to said arm for rotating it, said rotating arm having a hub concentric with its axis, said hub having an axial bore, a shaft passing through said bore and geared at one end to said recording device for moving it lengthwise of said arm when said shaft is rotated, a pinion at the other end of said shaft, and a gear wheel connected to said reel for driving said pinion when said reel is rotated.

18. In a device of the class described, the combination of a table, a rotatable arm rotating in a plane parallel to said table, a recording device traveling upon said table and movable lengthwise of said arm, a reel geared to said recording element for moving it lengthwise of said arm when said reel is rotated, a wire wound upon said reel, a stationary guide through which said wire passes in leaving said reel, a second arm rotatable about the center of the guide as an axis, the portion of the wire beyond the guide being angularly movable and connected to said second arm at a point remote from the axis thereof for rotating it, the first and second arms being rotatable in different planes and being geared together whereby the rotation of the arm engaged by the wire is imparted to the first mentioned arm.

19. In a device of the class described, the combination of a table, a recording device traveling upon said table, a rotary element rotatable in a plane parallel to said table and connected to said recording device for moving it in an arc centered at the axis of said rotary element, a reel, a wire partially wound upon said reel, said wire being connected to said rotary element for rotating it, and the sag of the wire producing an added rotation, a counter-balance weight also connected to said rotary element to rotate it in a direction opposite to the direction it is moved by the sag of the wire, and means operated by said wire for moving said counter-balance to a point of increased leverage in proportion as the wire is unwound from the reel, whereby the greater the amount of wire out, and the greater the sag of the wire, the greater will be the counter-balancing effect of said counter-balance.

20. In a device of the class described, the combination of a table, a recording device traveling upon said table, a rotatable arm rotatable in a plane parallel to said table and extending radially from its axis, said recording device being movable lengthwise of said arm, a reel geared to said recording device for moving the same lengthwise of said arm, said arm moving said recording device angularly with respect to the axis of said arm, a wire winding onto and off of said reel for rotating it, a stationary guide through which said wire passes in leaving said reel, the portion of said wire beyond said reel being angularly movable in a vertical plane and said arm being connected to a point on the wire outside of said guide and remote therefrom whereby the vertical movement of the wire rotates said arm about its axis and the sag of the wire produces an added rotation, a counter-balance weight acting upon said arm to rotate it in a direction opposite to the direction produced by the sag of the wire, and means operated by said wire in its movement from the reel for moving said counter-balance weight to a point of increased leverage.

21. In a device of the class described, the combination of a table, a recording device traveling upon said table, a rotatable arm rotatable in a plane parallel to said table and extending radially from its axis, said recording device being movable lengthwise of said arm, a reel geared to said recording device for moving the same lengthwise of said arm, said arm moving said recording device angularly with respect to the axis of said arm, a wire winding onto and off of said reel for rotating it, a stationary guide through which said wire passes in leaving said reel, a second arm rotatable in a vertical plane about the center of the guide as an axis, an eye at the outer end of said arm through which said wire passes, a counter-balance weight having a path diametrically opposite to the length of said second arm, and means operated by said wire for moving said counter-balance weight away from its axis as the wire is unwound from the reel, said second arm being geared to the first mentioned arm for rotating it in proportion to the rotation of the second arm.

22. An instrument of the class described having a table, a recording device traveling upon said table, a rotary member rotating in a plane parallel to the table and connected to said recording device for moving it in an arc centered at the axis of said rotary member, a wire, a reel for said wire, and means operated by said reel for moving said recording device along the table in a direction toward and from the axis of said rotary member.

23. An instrument of the class described having a table, a rotary member rotating in a plane parallel to the table, a planimeter having its fixed pivotal point coincident with the axis of said rotary member, and having its wheel traveling upon said table, said wheel being connected to said rotary element whereby the rotation of said rotary member about its axis produces a corresponding angular movement of said planimeter wheel, a reel, a wire for rotating said reel, and means operated by said wire for moving said planimeter wheel upon the table in a direction toward and from the axis of said rotary member.

24. An instrument of the class described having a table, a rotary arm rotating in a plane parallel to the table and extending radially from its axis, a planimeter including a planimeter wheel rolling upon said table, and a jointed arm connected at one end to said wheel and at the other end rotating about a fixed axis perpendicular to the table and coincident with the axis of said arm, said wheel being connected to said arm whereby the angular movement thereof produces a corresponding angular movement of said planimeter wheel, a reel, a wire for rotating said reel, and means operated by said wire for moving said planimeter wheel lengthwise of said rotary arm.

25. An instrument of the class described having a table, a rotary arm rotating in a plane parallel to the table and extending radially from its axis, a planimeter including a planimeter wheel rolling upon said table, and a jointed arm connected at one end to said wheel and at the other end rotating about a fixed axis perpendicular to the table and coincident with the axis of said arm, said wheel being connected to said arm whereby the angular movement thereof produces a corresponding angular movement of said planimeter wheel, a reel, a wire for rotating said reel, and means operated by said wire for moving said planimeter wheel lengthwise of said rotary arm, the free portion of said wire being connected to said arm whereby the angular movement of the free portion of the wire produces a corresponding angular movement of said rotary arm about its axis.

In witness whereof, we have hereunto subscribed our names.

JOHN AIREY.
KARL F. KEELER.

Copies of this patent may be obtained for five cents each, by addressing the "Commissioner of Patents, Washington, D. C."